United States Patent
Meneely, Jr.

(10) Patent No.: US 7,632,178 B2
(45) Date of Patent: Dec. 15, 2009

(54) VENTILATION BLOWER CONTROLS EMPLOYING AIR QUALITY SENSORS

(75) Inventor: William J. Meneely, Jr., Bellmore, NY (US)

(73) Assignees: William Meneely, Island Park, NY (US); Julio Gabriel Shtanko, Island Park, NY (US); Paul D' Ascoli, Island Park, NY (US); Anthony Russo, Island Park, NY (US), a limited partnership; Dba G.B.T.P. Venting, Island Park, NY (US)

( * ) Notice: Subject to any disclaimer, the term of this patent is extended or adjusted under 35 U.S.C. 154(b) by 147 days.

(21) Appl. No.: 11/329,017

(22) Filed: Jan. 10, 2006

(65) Prior Publication Data

US 2006/0154596 A1 Jul. 13, 2006

Related U.S. Application Data

(60) Provisional application No. 60/642,733, filed on Jan. 10, 2005.

(51) Int. Cl.
*F24F 11/00* (2006.01)
*F24F 7/00* (2006.01)
*G01N 1/16* (2006.01)

(52) U.S. Cl. ................. 454/239; 454/237; 454/256; 454/257; 73/863.33

(58) Field of Classification Search ............ 454/228, 454/229, 239, 256, 257, 237; 73/863.33
See application file for complete search history.

(56) References Cited

U.S. PATENT DOCUMENTS

| | | | |
|---|---|---|---|
| 4,819,551 A | 4/1989 | Vole | |
| 4,893,113 A | 1/1990 | Park et al. | |
| D324,418 S | 3/1992 | Shtanko | |
| 5,120,271 A | 6/1992 | Shtanko | |
| 5,239,980 A | 8/1993 | Hilt et al. | |
| 5,257,736 A * | 11/1993 | Roy | 236/49.3 |
| 5,276,434 A | 1/1994 | Brooks et al. | |
| 5,428,964 A | 7/1995 | Lobdell | |
| 5,438,324 A * | 8/1995 | Chyi et al. | 340/632 |
| 5,682,145 A | 10/1997 | Sweetman et al. | |
| 5,683,293 A | 11/1997 | Mohammed | |
| 5,742,516 A | 4/1998 | Olcerst | |
| 5,793,296 A * | 8/1998 | Lewkowicz | 340/632 |
| 6,053,809 A | 4/2000 | Arcencaux | |
| 6,110,038 A | 8/2000 | Stern | |
| 6,339,379 B1 | 1/2002 | Argus et al. | |
| 6,425,297 B1 * | 7/2002 | Sharp | 73/863.33 |

(Continued)

*Primary Examiner*—Steven B McAllister
*Assistant Examiner*—Patrick F. O'Reilly, III
(74) *Attorney, Agent, or Firm*—Alfred M. Walker

(57) ABSTRACT

A fresh air ventilation system in a building having an outside wall exhausts contaminants, such as stale or noxious air, through the outside wall and takes in fresh air. A remote switch sets a mode of operation of the ventilation system. One or more strategically placed air quality sensors are located within the building. The sensors may be connected wirelessly through a multiplexer interconnect system to operationally control the fan of the exhaust system. In response to the detection of a contaminant above a pre-selected level by a sensor, the relay controller for the sensors resets the remote switch for continuous high speed operation to evacuate the contaminants from the building through either special ducts or the conventional air ventilation ducts within the building.

4 Claims, 15 Drawing Sheets

U.S. PATENT DOCUMENTS

| | | |
|---|---|---|
| 6,503,141 B2 | 1/2003 | Meneely, Jr. |
| 6,711,470 B1 * | 3/2004 | Hartenstein et al. ......... 700/276 |
| 6,743,091 B2 | 6/2004 | Meneely, Jr. |
| 6,774,802 B2 | 8/2004 | Bachinski et al. |
| 6,779,735 B1 * | 8/2004 | Onstott ........................ 236/13 |

* cited by examiner

VENTILATION BLOWER CONTROLS EMPLOYING AIR QUALITY SENSORS

CROSS REFERENCE TO RELATED APPLICATIONS

This application claims the benefit, Under 35 U.S.C. 119 (e) of U.S. Provisional Application No. 60/642,733, filed Jan. 10, 2005, which is hereby incorporated by reference.

FIELD OF THE INVENTION

The present invention relates to air quality controls in a building.

BACKGROUND OF THE INVENTION

U.S. Pat. Nos. 6,503,141 and 6,743,091 of Meneely, Jr. describe carbon monoxide venting systems using an exhaust blower or fan triggered by a CO detector or sensor.

Air quality sensors for a wide variety of contaminants are available. For example, combustible gas detectors, CO sensors and radon detectors are available for internet purchase on the Promo-Life web site. Other sensors for ammonia and smoke are also commonly available.

Whole house or commercial establishment fresh air ventilation systems are also available. They typically employ at least two blowers, one for removing stale indoor air to the outside of the building and a second blower to replace the removed stale air with fresh air from the outside. They have plenums and ducts for air distribution, heat exchangers to reduce energy loss from the conditioned indoor air being exhausted by preconditioning the replacement outdoor air, filters, and perhaps even electronic air purifiers. These systems can be run continuously, set and run manually, run on a preset intermittent schedule, or controlled by a humidistat. The blower speed, and hence the air exchange rate, are usually settable.

OBJECTS OF THE INVENTION

It is therefore an object of the present invention to provide a multi-sensor point source blower for extracting contaminants from a single room.

It is also an object of the present invention to provide a control system integrated with multiple sensors for controlling the operation of fresh air ventilation systems.

It is also an object of the present invention to utilize ducts of air ventilation systems for evacuating noxious fumes, such as carbon monoxide, smoke, and other malodorous odors from a building.

Other objects will become apparent from the following description of the present invention.

SUMMARY OF THE INVENTION

In keeping with these objects and others which may become apparent, the systems of this invention use one or more air quality sensors to control the operation of ventilation blowers.

A multi-sensor point source blower extracts contaminants from a single room. Also, the control system integrated with multiple sensors controls the operation of fresh air ventilation systems.

In the first embodiment, a plurality of air quality sensors, such as, for example, a relative humidity sensor, an ammonia sensor, and a methane sensor, are used to control the operation of an exhaust blower in either a bathroom or a laundry room, in a point-source venting application.

In a bathroom, the objective is to automatically control the vent blower or fan that is commonly controlled by a manual wall switch.

Also in the prior art are control methods using occupancy detectors with timer elements. The manual control is feasible for the general population, but small children or elderly people using the bathroom may forget to turn the blower on or off; also, the offensive odor or high humidity is not removed by the blower by the time the occupant leaves and turns it off. The occupancy detector solution with delay, turns on the blower when it is clearly not needed, as when someone simply enters to wash one's hands.

In the present invention, any one or more of the sensors can trigger and sustain blower operation. The ammonia sensor detects a byproduct of urination, and the methane detector detects a byproduct of defecation. So it can be appreciated that the exhaust blower can be first switched on automatically when an occupant uses the toilet, and it can be automatically switched off later after the occupant has taken a shower when the relative humidity has decreased to threshold level (long after any odorous remnants have been removed). In a laundry room, the same point source system can be used especially if a cat box is placed there (a common location for such a pet accessory). In this embodiment, no intelligent controller is required. The three sensors are simply wired in parallel with blocking diodes (if needed) so each can independently turn on the blower through a solid-state or electromechanical relay.

In the second embodiment, one or more air quality sensors is used to influence the operation of an existing fresh air ventilation system. Some ventilation systems, such as the Honeywell HR150 and HR200 Perfect Window, are especially easy to retrofit with certain types of sensors since they have a Remote Switch connection which sets the system controller for continuous high speed operation. If carbon monoxide, fuel gasses, or smoke are detected within the building envelope, this is specifically the desired setting of the ventilation system. Although a single carbon monoxide sensor placed inside the stale air exhaust plenum and wired to simulate switch contacts (by activating an electromagnetic relay) can be used to switch on the system to high, this is not the ideal solution, but can be simply done by wiring the relay contacts to the Remote Switch terminals. This placement for a sensor will pick up a contaminant for which it is designed if it is being emitted anywhere in the building, however if the fresh air ventilation system is being used intermittently, the contamination would not be detected until the system is turned on (even on low). So multiple sensors such as carbon monoxide or smoke sensors should be deployed within the stale air plenum (next to the heat exchanger) as well as in other locations within the building envelope which are likely point sources such as a furnace room or a kitchen. All such sensors should be wired in parallel (with blocking diodes if necessary) to control a single relay whose normally open contacts are wired to the Remote Switch interface terminals. More extensive modifications to obtain the "HIGH/CONTINUOUS" setting on sensor demand may be required on ventilation systems without a prewired Remote Switch interface. A preferable configuration would have a carbon monoxide sensor and a smoke detector within the stale air plenum and one or more external carbon monoxide detectors (such as furnace room and adjacent to fireplace or wood stove) and one or more external smoke detectors (kitchen and fireplace/wood stove vicinity). In addition, a fuel gas detector near gas appliances is also desirable.

In the third embodiment, the fresh air ventilation system controller is enhanced with sensor interfaces and with software to control the monitoring of a variety of sensors and then to control the system with appropriate actions. In some cases where conflicting actions are indicated, a priority logic scheme is used to resolve the conflict. In one configuration, the sensors are wired individually in "star" fashion and the controller samples the sensors in a continuous loop. In a second configuration, all sensors are wired across a single pair of wires with local address decoders. The controller then puts out one address at a time on the common multiplexor line, the proper sensor decodes its own address and responds to the system with its status.

In a third configuration, some or all of the sensors are wireless, and a wireless multiplexor is used for system/sensor communications. Regardless of the communications configuration and protocol, an out-of-bounds sensor condition will post an action. The action will be compared with other outstanding actions and with current system status before it is serviced, depending on priorities. In this embodiment, sensors would be placed within both the stale air as well as the fresh air plenums, and multiple sensors inside and outside the building envelope can be used.

Configurations of specific sensors are a function of each particular installation. For example, a fuel gas sensor would not be used in an all-electric house. An example of a possible sensor configuration and some sensor actions follows. A house in a wooded area has a fresh air ventilation system with a carbon monoxide (CO) sensor and a smoke sensor in the stale air plenum and with a smoke detector in the fresh air plenum. A second CO sensor is in the furnace room and a third is in the garage. A second smoke sensor is in the kitchen, a third is near the fireplace, and a forth is on the south exposure on the outside. A fuel gas sensor is in the furnace room, and a radon sensor in on the balcony ceiling.

Clearly, if a stale air plenum or interior CO sensor is triggered, the appropriate action is to immediately latch on both the flashing light as well as the acoustic alarms and to set the ventilation system on full/continuous operation.

However, if the CO sensor in the garage is triggered, the condition should be noted, and a target time for action if the condition persists is posted. If the condition does not clear up in the allotted time, the alarms and venting should proceed; this delayed action prevents triggering on transient CO levels in the garage due to arriving or departing vehicles.

The smoke alarms in the stale air plenum and the interior as well as the fuel gas sensor are handled in a similar fashion to the interior CO sensors. Consider the radon sensor; a high detected level initially turns on the vent system "ON/LOW" if it had been off. A scheduled action to increase the speed by an appropriate step if the level persists above the threshold level is a follow-up action.

The situation might also put an "event item" in the system log or perhaps turn on the visual alarm at some increment level. Clearly, a CO, fuel gas, or smoky interior problem would take priority and set the appropriate alarms and the vent speed on "HIGH".

The smoke detector on the house exterior and the one in the fresh air plenum detect smoke from brush or forest fires, or simply fumes from a neighbor burning trash. In any case, the ventilation system is turned off to prevent bringing the foul exterior air inside and plugging up the inlet air filter. The alarms may be delayed to distinguish a temporary situation.

To summarize the third embodiment of this invention, the control system of a fresh air ventilation system is enhanced with hardware and software to accommodate a variety of air quality sensors and to respond to their trigger responses in an appropriate manner. The exact actions and delays can be fine tuned at installation time by a trained technician upon consultation with the occupants of the building or home.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE PREFERRED EMBODIMENTS

The present invention has broad applications to many technical fields for a variety of articles. For illustrative purposes only, preferred modes for carrying out the invention are described herein.

Figure 1:
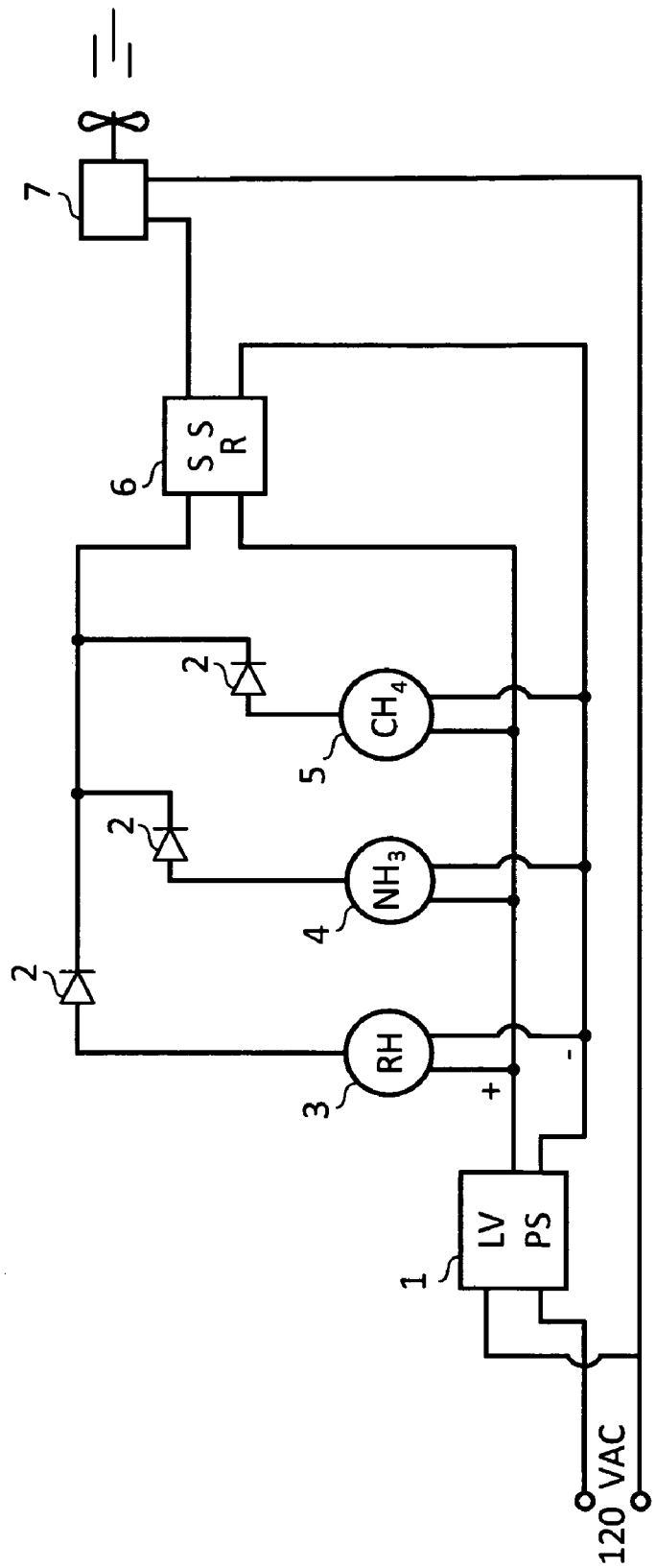
FIG. 1 is a schematic diagram of a first embodiment for a multi-sensor point-source exhaust blower for exhausting air from a room.

FIG. 1 depicts a multi-sensor point-source exhaust blower which is useful for exhausting air from a room such as a bathroom or laundry room. Three sensors especially useful for a bathroom are shown; these are a relative humidity (RH) sensor 3, an ammonia ($NH_3$) sensor 4, and a methane ($CH_4$) sensor 5. Low voltage power supply (LVPS) 1 powered by AC mains (120 VAC) provides low voltage DC to operate the three sensors. Diodes 2 at the output of each sensor provide DC isolation among them while permitting any one or more of the sensors to turn on and keep on blower 7 as controlled by solid-state or electromagnetic relay 6. The network of three diodes 2 operates as a logic OR circuit. A similar setup with perhaps different and more appropriate sensors (2, 3 or more) could be used to ventilate an industrial storage room. The intent for a bathroom is for the sensor 3 to be useful when showering, and for sensors 4 and 5 to be useful when using toilet facilities.

Figure 2:
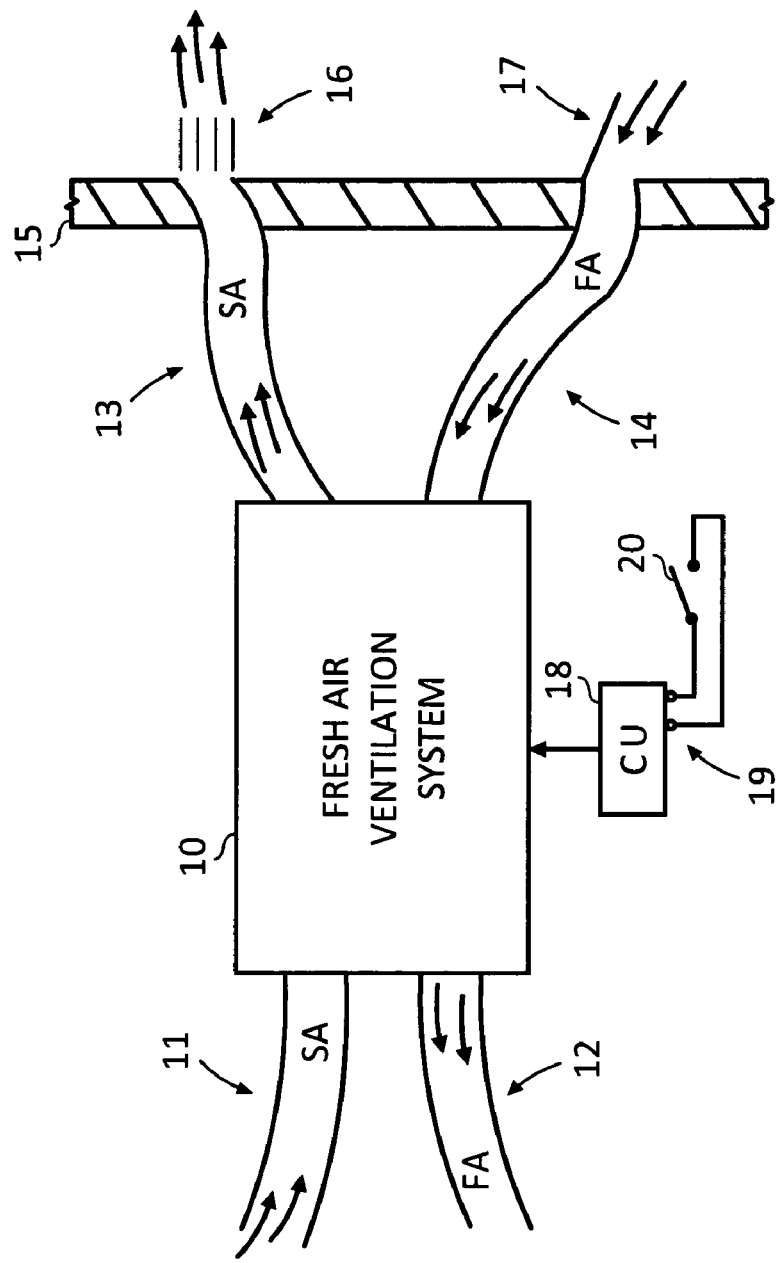
FIG. 2 is a block diagram of a prior art fresh air ventilation system.

Fresh air ventilation system 10 of FIG. 2 represents any of a number of prior art whole house or commercial systems incorporating at least a stale air blower and a fresh air blower. To save energy, such a system 10 would commonly also incorporate a heat exchanger. A control unit (CU) 18 of some level of sophistication is used to operate system 10; in some cases, terminals 19 are provided to permit the installation of wall switch 20 which is used to signal system 10 to turn ON to a maximum or HIGH setting of both stale air and fresh air blowers. This prior art system of FIG. 2 uses plenums or ducts to convey air to and from various regions; 11 is the stale air plenum from the interior while plenum 13 conveys the stale air from system 10 through an opening in exterior wall 15 through louvers 16 to the outside. Similarly, fresh air plenum 14 brings in fresh air from outside through vent 17 in wall 15; plenum 12 delivers fresh air to various interior destinations through one or more ducts.

Figure 3:
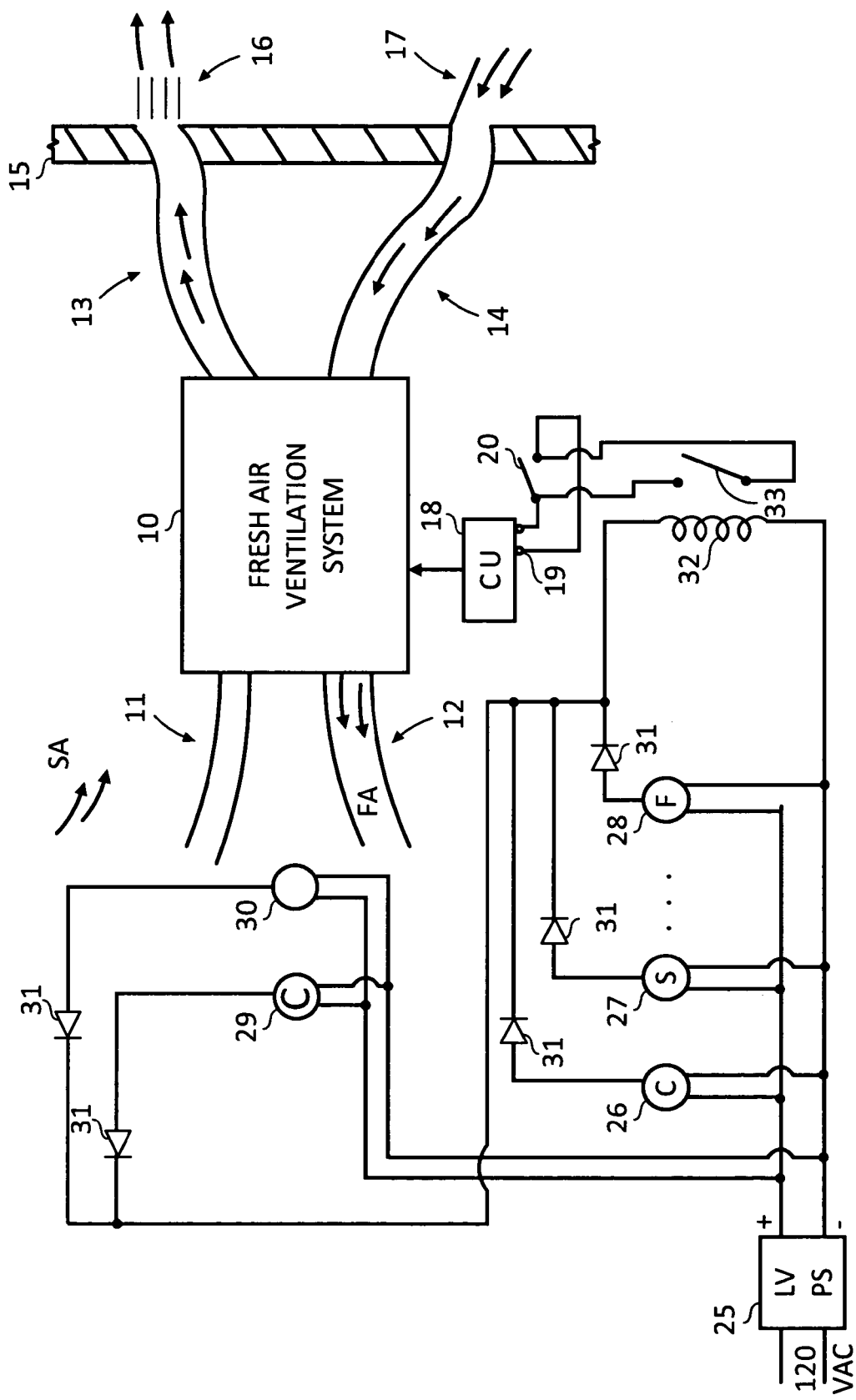
FIG. 3 is a high level wiring diagram of the second embodiment of this invention showing the addition of air quality sensors retrofitted to the ventilation system of FIG. 2.

FIG. 3 shows how the system of FIG. 2 can be retrofitted in accordance with the present invention with multiple air quality sensors to exhaust contaminated air at a HIGH setting and bring in fresh air also at the HIGH setting regardless of the state of operation (such as OFF or LOW) at the time a sensor detects a contamination. A variety of sensors from within the enclosed space as well as inside the stale air plenum are wired into a network in such a manner that any one or more of them can trigger and hold ON relay 32 (logical OR connection). This can be accomplished as shown in FIG. 3 by using diodes 31 at the output of each sensor. Note that a sensor within stale air plenum 11 near the junction with system 10 will sample air from anywhere in the interior space, in time, if system 10 is turned ON (even on LOW). However, if system 10 is OFF, only a sensor external to plenum 11 will detect a contaminant. So, for effective timely detection, a combination of within plenum sensors, such as carbon monoxide (CO) sensor 29 and smoke detector 30, as well as additional carbon monoxide (GO) sensor 26, smoke detector 27 and fuel gas sensor 28 external to plenum 11 and in the vicinity of likely contaminants are recommended. The normally open contacts 33 of relay 32 simulate operation of wall switch 20 and will put the system into HIGH speed operation. In FIG. 3, all sensors are shown powered by a single low voltage power supply (LVPS) 25, but wiring can be reduced by providing local power supplies for each sensor; power wiring can be eliminated by using battery powered sensors.

Figure 4:
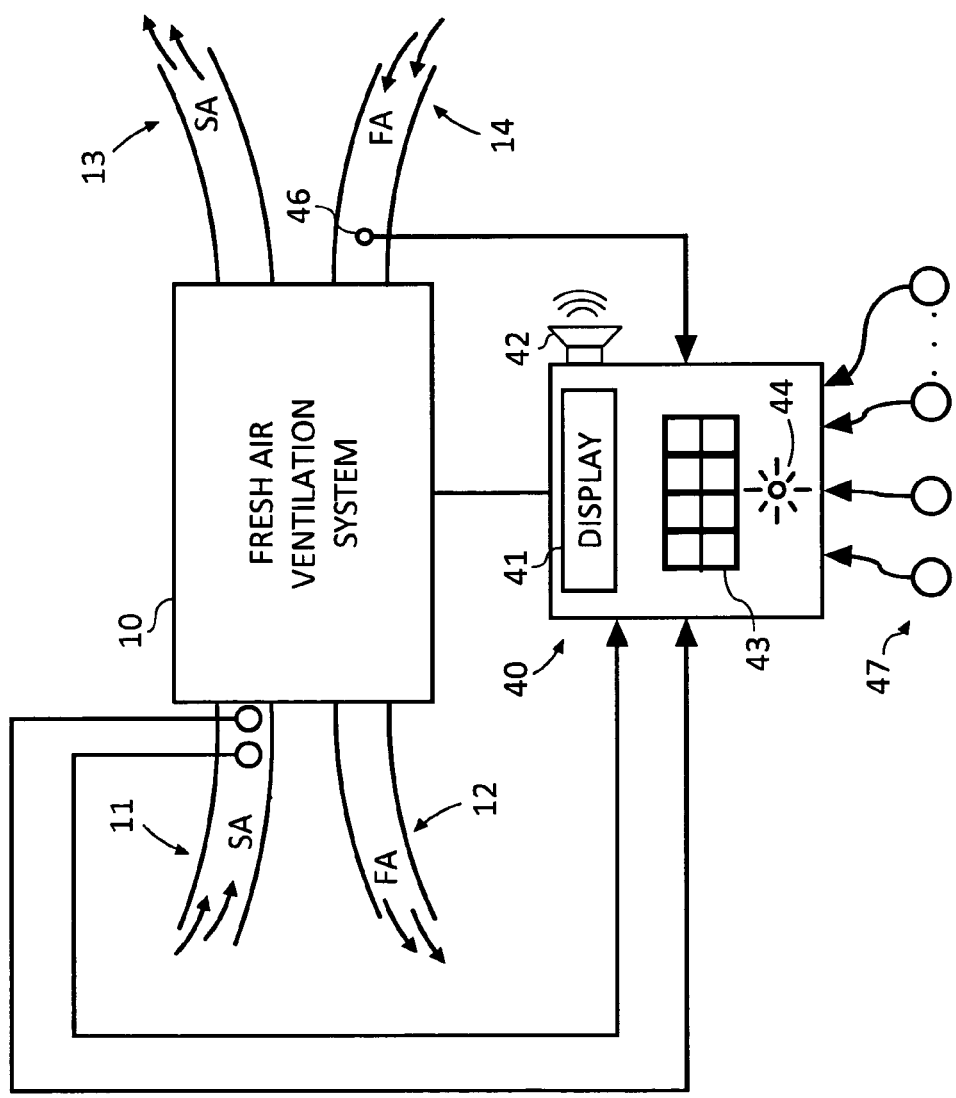
FIG. 4 is a block diagram of a third embodiment comprising an enhanced fresh air ventilation system.

Beyond retrofitting a fresh air ventilation system, an enhanced controller with a microprocessor can run software that implements control features not possible by simply interfacing via a "wall switch" interface. The third embodiment of this invention as depicted in FIG. 4 shows an enhanced controller 40 controlling the mechanical subsystem of fresh air ventilation system 10 with sensors 45 in stale air plenum 11, sensor 46 in intake fresh air plenum (or on exterior building surface), and sensors 47 distributed throughout the interior. Controller 40 has display 41, input keypad 43, audio alarm 42 and visual flashing light alarm 44.

Figure 5:
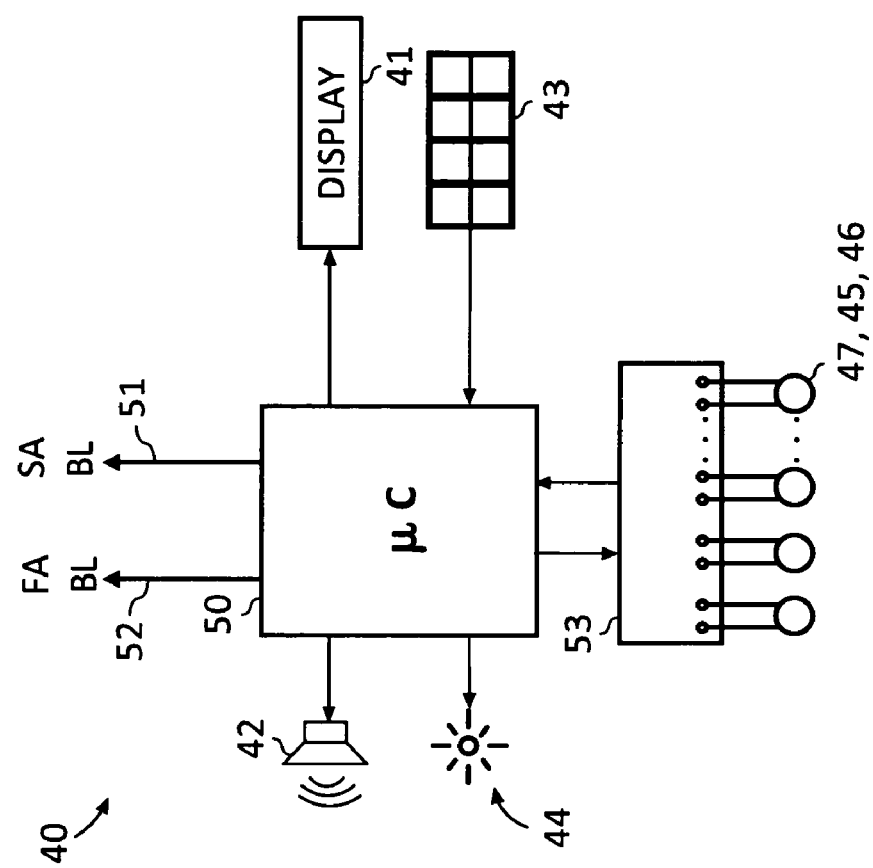
FIG. 5 is a block diagram of the controller for the enhanced system shown in FIG. 4 employing a matrix switch interconnect for multiple sensors.

FIG. 5 is a block diagram of enhanced controller 40 showing control line 52 for the fresh air blower and control line 51 for the stale air blower, which can select the speed from zero to maximum on these respective blowers. Multiple air quality sensors 45,46 and 47 are connected to microprocessor 50 via matrix switch 53 which can select any sensor for interrogation under program control.

Figure 6:
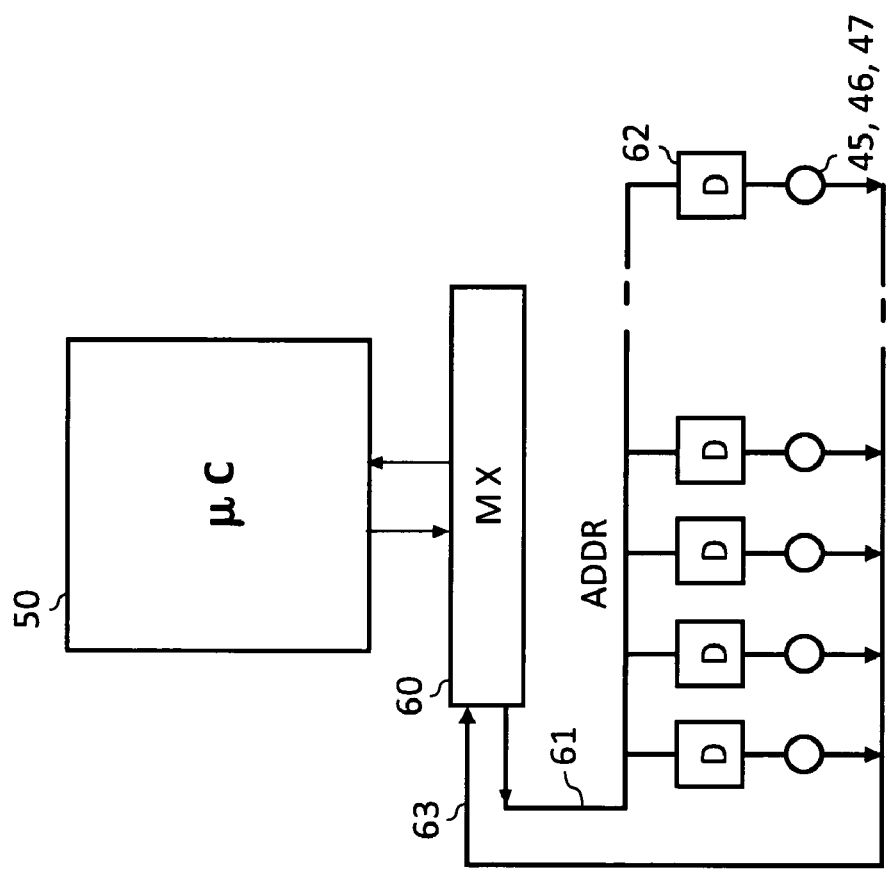
FIG. 6 is a block diagram of an alternate multiplexor interconnect for multiple sensors.
Figure 7:
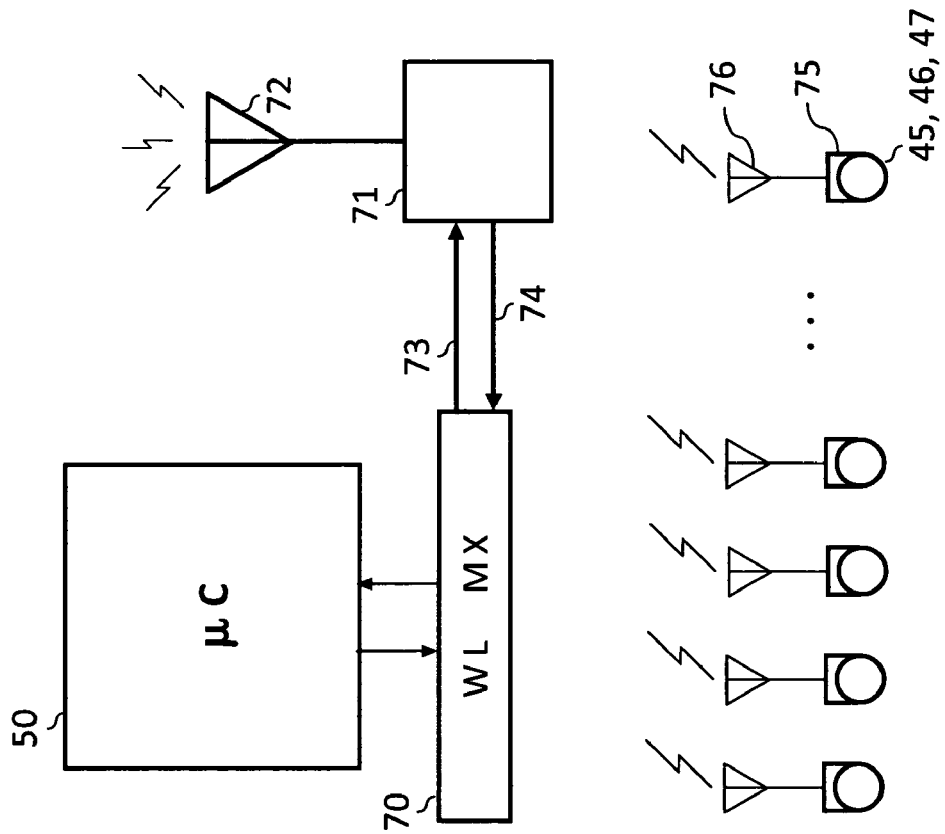
FIG. 7 is a further block diagram showing a third interconnect for multiple sensors employing a wireless multiplexor.

Alternative interconnect schemes are shown in FIGS. 6 and 7. In FIG. 6, each sensor 45,46 and 47 is equipped with an address decoder 62 which responds when its own specific address is output on address bus 61; sensor status or data output is then placed on data bus 63 for interrogation by processor 50 via multiplexor interconnect 60.

In FIG. 7, a wireless multiplexor 70 using transceiver 71 and antenna 72 connected to address bus 73 and data bus 74 are used with sensors 45, 46 and 47 which are each equipped with their separate transceivers 75 and antennas 76. In any given system, a combination of interconnect technologies can be used to logically attach any given set of sensors to processor 50.

Figure 8:
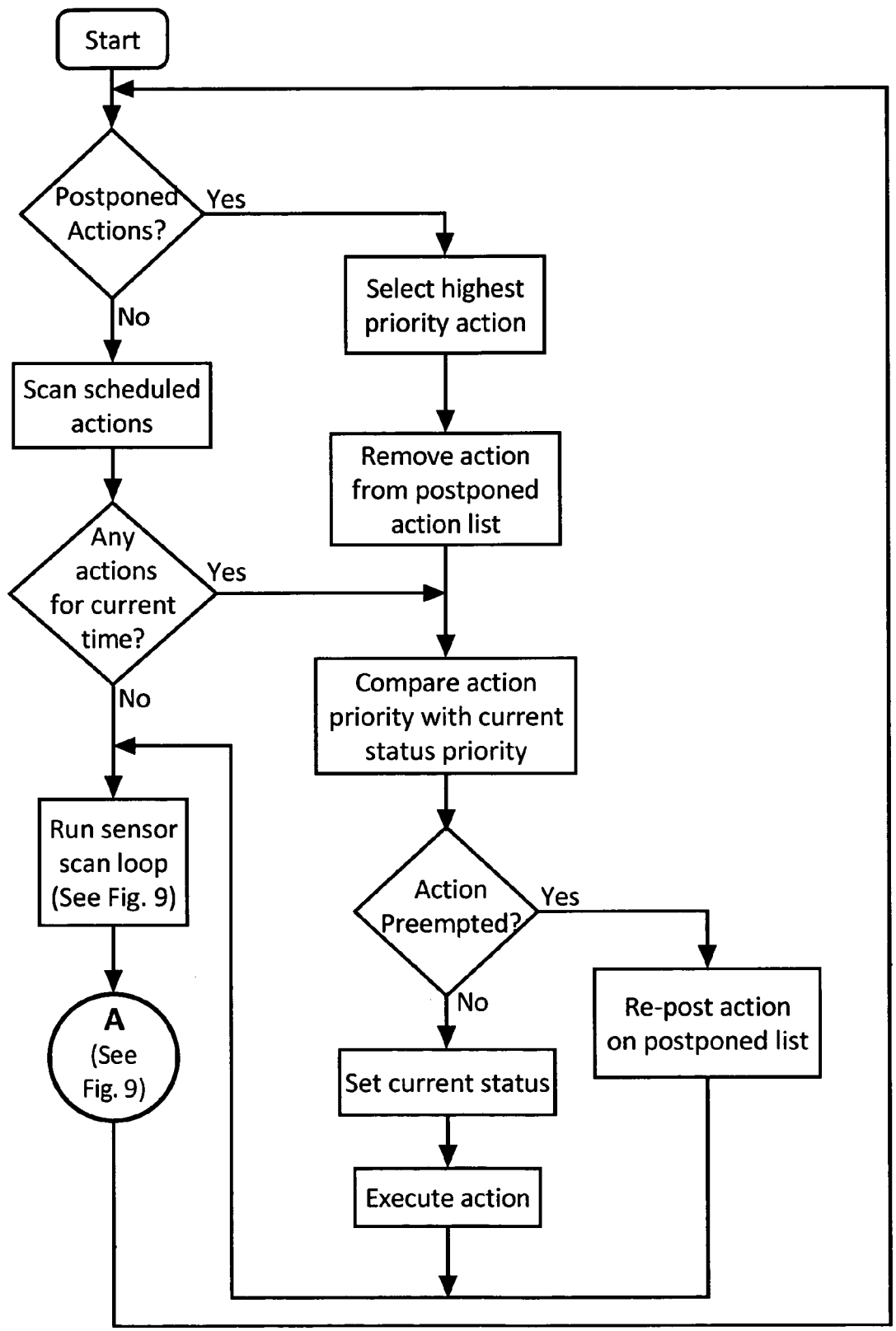
FIG. 8 is a master loop flow chart as run on the microprocessor of the controller in the third embodiment of the present invention.

FIG. 8 shows a high level main control loop of the software running on microprocessor 50. Several notions are relevant to this control flow. One notion is current time, another is priority level among pending actions, and another important notion is that of an "action". An action is a software routine that controls system 10 to take a specific action, or it is an analysis of current and/or past sensor data that is interpreted to cause a certain system 10 control action. For example, detection of smoke or high levels of carbon monoxide are danger situations which are of the highest priority, but in some cases, the action may be to delay setting subsystem 10 to HIGH and sounding alarms. In the case of a carbon monoxide (CO) sensor in a garage or a smoke detector in the vicinity of a wood stove or fireplace, the controller 50 may take a "time out" on action to preclude "false positive" in case the carbon monoxide (CO) sensor was simply detecting car start-up prior to departing, or the smoke detector was detecting the opening of a stove door or the stoking of a fireplace fire. The action routine for these sensors may simply ask for a verification "re-test"at a later time, or a more sophisticated approach may call for a contaminant decay profile threshold as a function of time. Similarly, the notion of priority is used to possibly change current operation of the blowers based on the severity of the sensor conditions being serviced at the time. For example, fresh air plenum sensor 46 or an exterior sensor, a smoke detector, may detect exterior smoke from outside the building, and therefore shut down subsystem 10 to prevent smoky ambient air outside from being forcefully brought indoors; an alarm may be sounded as an alert to forest fire (or perhaps a nuisance from a neighbor burning trash). However, if a high level of interior carbon monoxide (CO) or fuel gas is sensed, processor 50 may be programmed to handle this higher priority event by turning subsystem 10 on HIGH, even in the presence of exterior smoke. Some of these decisions are factory programmed, while others may be overridden or selected by a service person in conjunction with a customer interview.

In FIG. 8, postponed actions (past due) are handled before scheduled actions unless priority dictates a scheduled action is indicated. Any preempted actions are placed on a "postponed action list".

Figure 9:
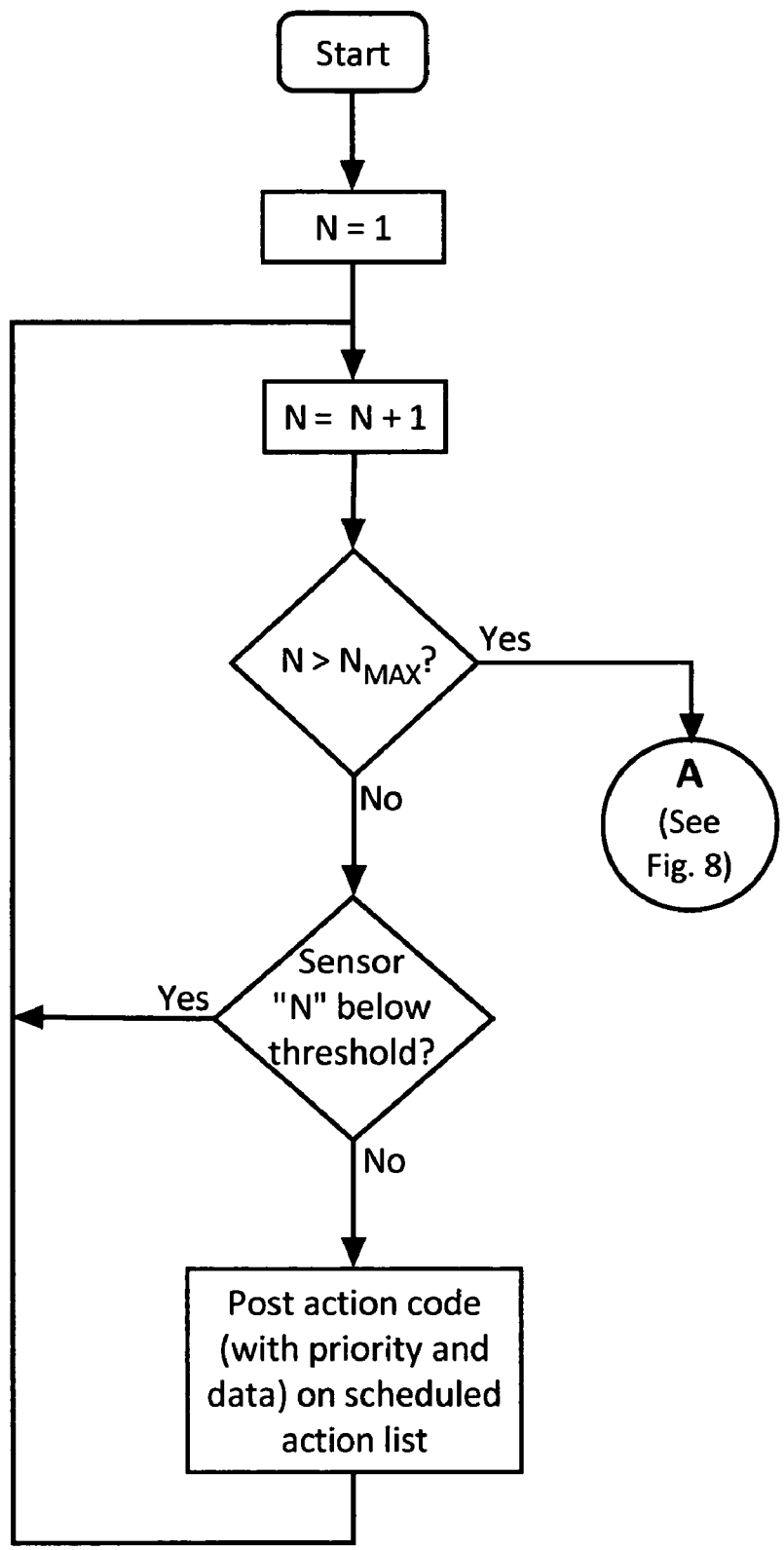
FIG. 9 is a flow chart of the sensor scan loop which is a detail of the master loop of FIG. 8.

The sensor scan loop is shown in FIG. 9. This simply samples the status of each sensor and posts any response that may require immediate or scheduled follow-up action. The priority associated with any action as well as any data such as actual sensor readings are also posted.

Figure 10:
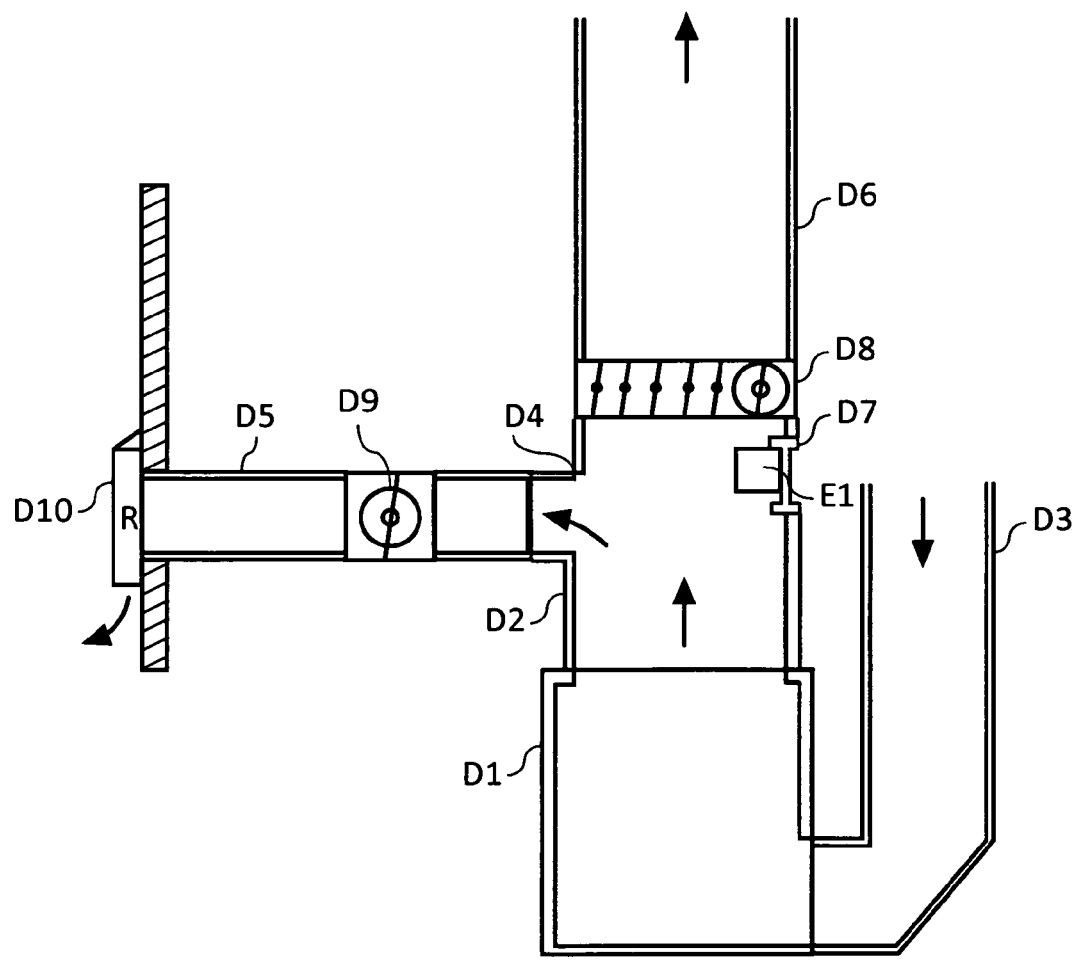
FIG. 10 is a schematic diagram of a home carbon monoxide venting system, including a ducting option.

FIG. 10 shows a ducting option for carbon monoxide venting system, which vents carbon monoxide gas by closing the supply duct/plenum with a damper and opening another damper to vent contaminating air outside. The dampers are electronically actuated and controlled by the venting system control module. The supply damper is shown as a louvered style in a rectangular duct, while the exhaust damper is shown as a circular duct/pipe style. For simplicity, the system is shown without an A/C coil. A supplied damper may be installed above or below the coil. As shown in the drawing figure, air enters the return duct/plenum D3 in a typical house return system and is sent to furnace D1. By "furnace" it is assumed to be any kind of building heater capable of producing carbon monoxide, whether gas, oil, steam or electrically fired.

The heat is sent out supply duct/plenum D2, where it is monitored by a carbon monoxide detector E1, which is attached preferably to a duct access door D7. There is a starting collar D4 in the supply duct/plenum, which includes a vent duct/plenum D5, having an exhaust damper therein. The supply duct/plenum also communicates with an exhaust vent D10 for exhausting carbon monoxide out of the building.

Figure 11:
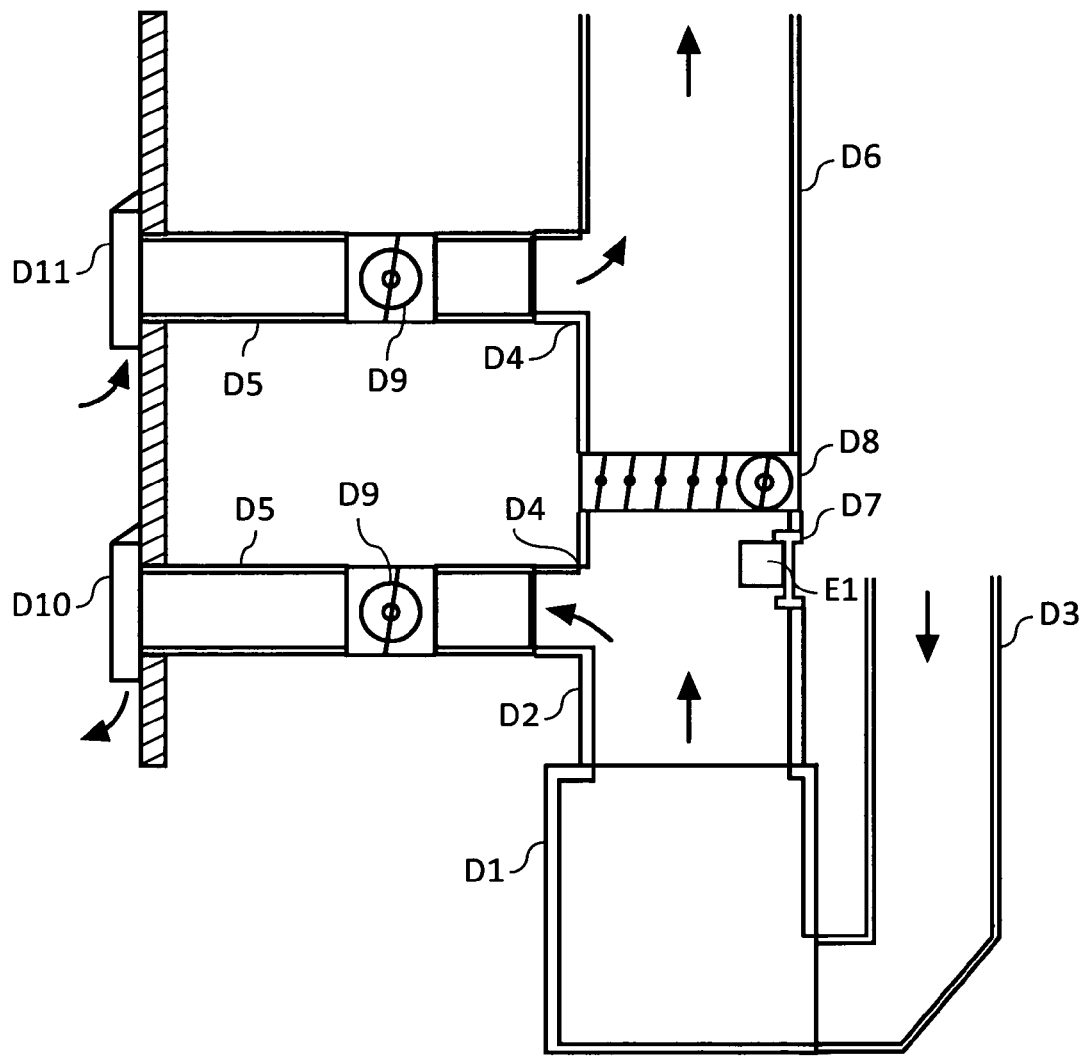
FIG. 11 is a schematic of a home carbon monoxide venting system, including an additional ducting option for an alternate embodiment.

An alternate embodiment shown in FIG. 11 airs exhaust from the house in the same manner as in FIG. 10, with the capability of drawing in fresh, outside air to accelerate the dissipation of the carbon monoxide gas. This is done through a second wall vent with an inlet flapper and a third damper. Wherein both dampers are normally closed, it may be possible to use a butterfly or offset-pin damper instead of an electronically actuated damper for the fresh air intake. In this drawing FIG. 11, there is provided an additional duct/plenum D5, which communicates with a fresh air inlet D11, having an exhaust fresh air damper therein, for pulling fresh air into the supply duct/plenum D6, supplying air within the building.

Figure 12:
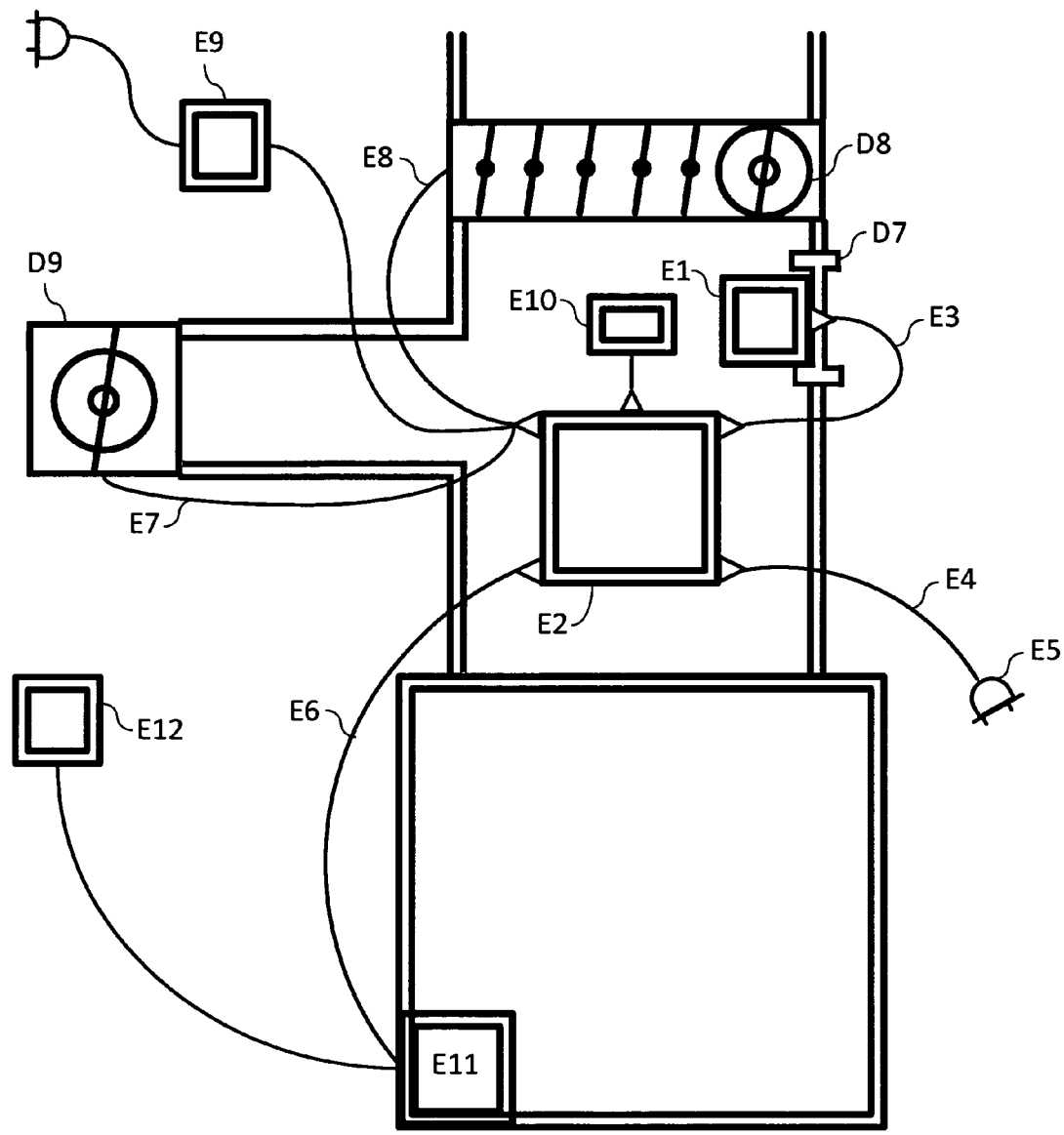
FIG. 12 is a schematic diagram of the electronic components of a carbon monoxide venting system.

FIG. 12 depicts one embodiment of a configuration of electronic components comprising a carbon monoxide venting system of the invention. In this system, a carbon monoxide (CO) system control module E2 can be wall mounted or mounted within the duct. It communicates via a control cable E4, connected to a wall plug or power supply within the building, which is dependent upon voltage chosen for the control modules, such as 110 VAC coming from the furnace. The carbon monoxide (CO) system control module is also connected via a TSAT data fan and heat control cable E6 connected to the furnace junction box in the furnace, which itself is further connected to the thermostat D12. The carbon monoxide (CO) system control module is also further connected to the carbon monoxide (CO) connector within the duct, as well as to the exhaust fresh air damper and the damper power transformer, which may not be needed if dampers operate on 110 VAC or 24 VAC. The control module further communicates via supply damper on/off cable E8, which is connected to the supply damper D8. A duct air temperature sensor with an optional air temperature sensor may be provided in the control module E2, if the control module is outside of the duct/plenum.

The cables E3, E4, E6 and E7 may be multi-conductor and they are connected by connectors to the control module E2.

Figure 13:
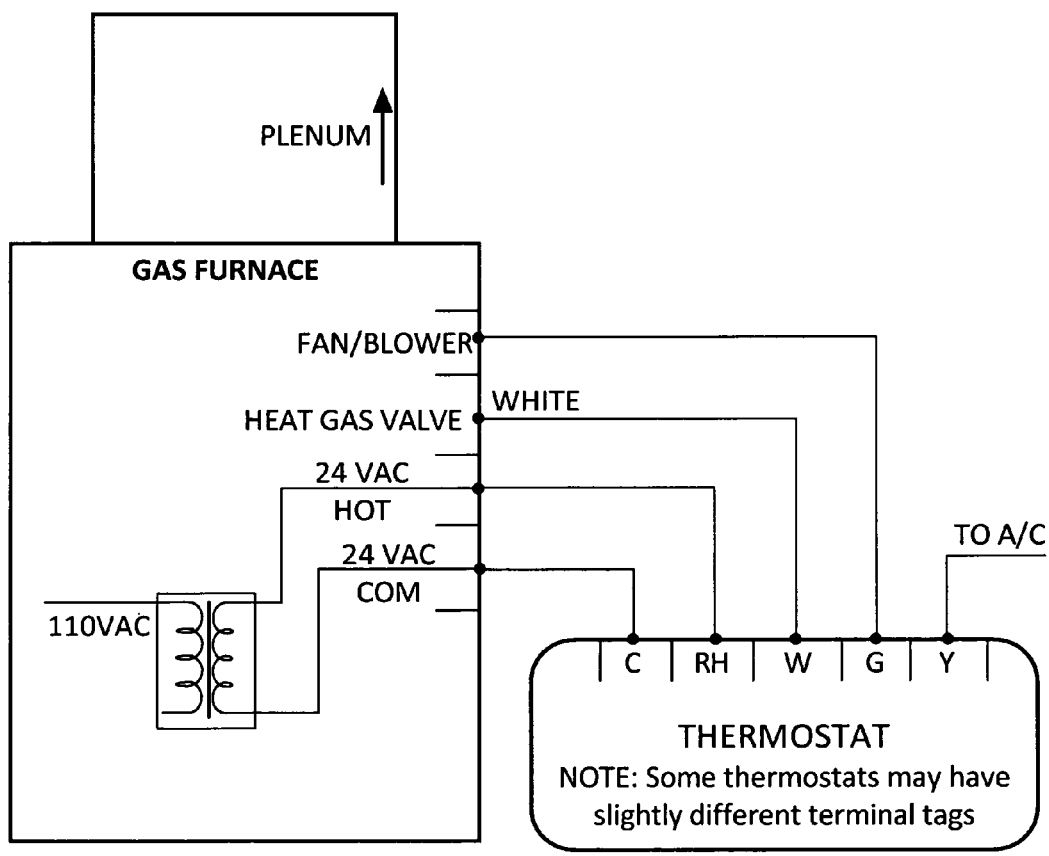
FIG. 13 is an electrical wiring diagram for a normal gas furnace.

In FIG. 13 the wiring diagram shows the gas furnace having a fan blower gas heat valve and a 24 VAC source is connected to 110 VAC, where they are converted to DC and connected to the thermostat.

Figure 14:
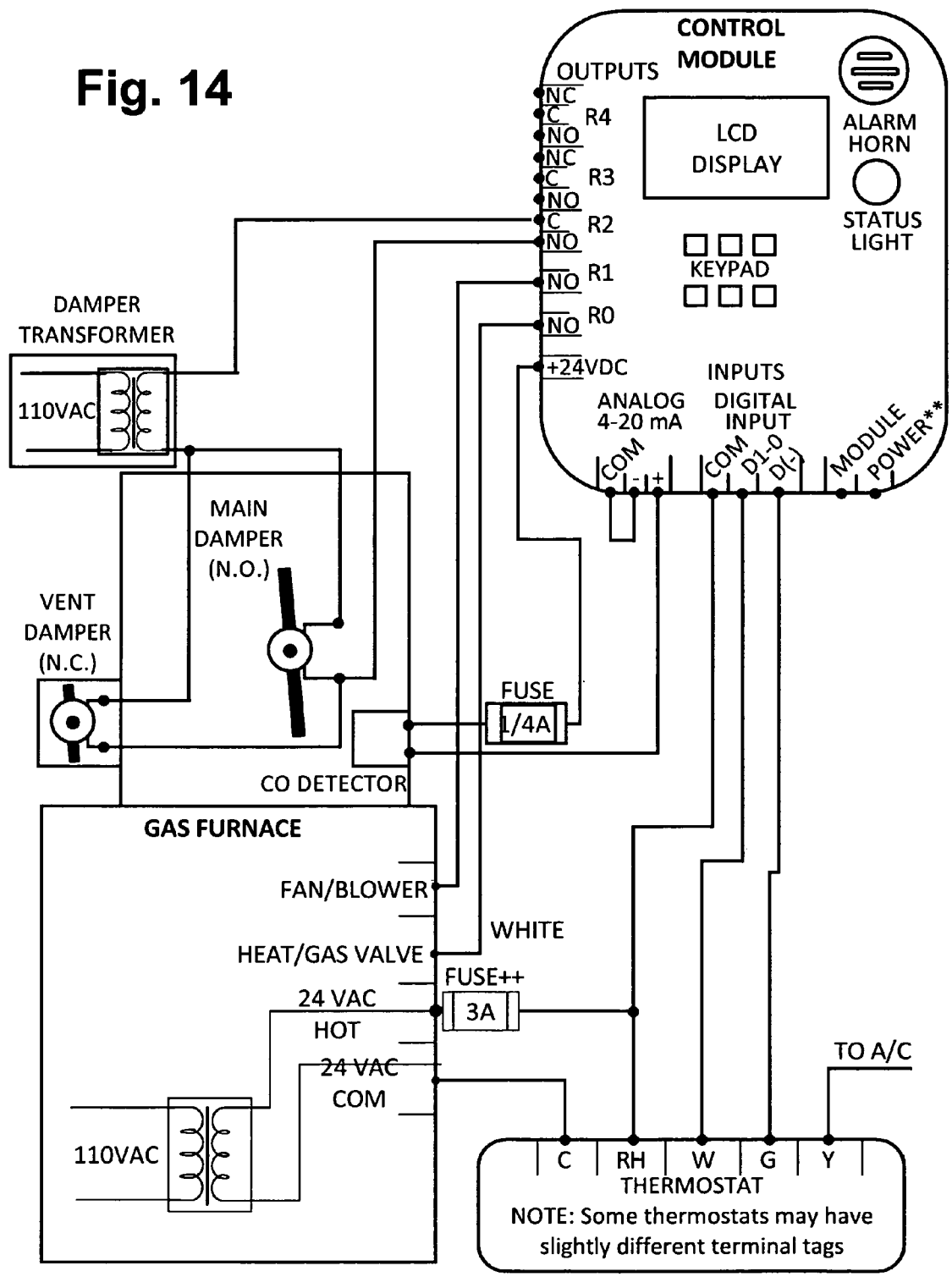
FIG. 14 is an electrical wiring diagram for a normal gas furnace with the carbon monoxide venting system; and, FIG. 15 is a program operational flow diagram for a carbon monoxide venting system.

FIG. 14 shows the wiring system as in FIG. 13, further communicating with the control module E2 of the present invention. Signal outputs R3 and R4 trigger external devices, such as security systems, horns, etc. The control module may be designed to use 120 VAC or 12 volts DC or 24 volts AC for operation. The damper transformer is optional and may not be necessary if 24 VAC from the furnace is appropriate. The fuse may be internal to the furnace.

Figure 15:
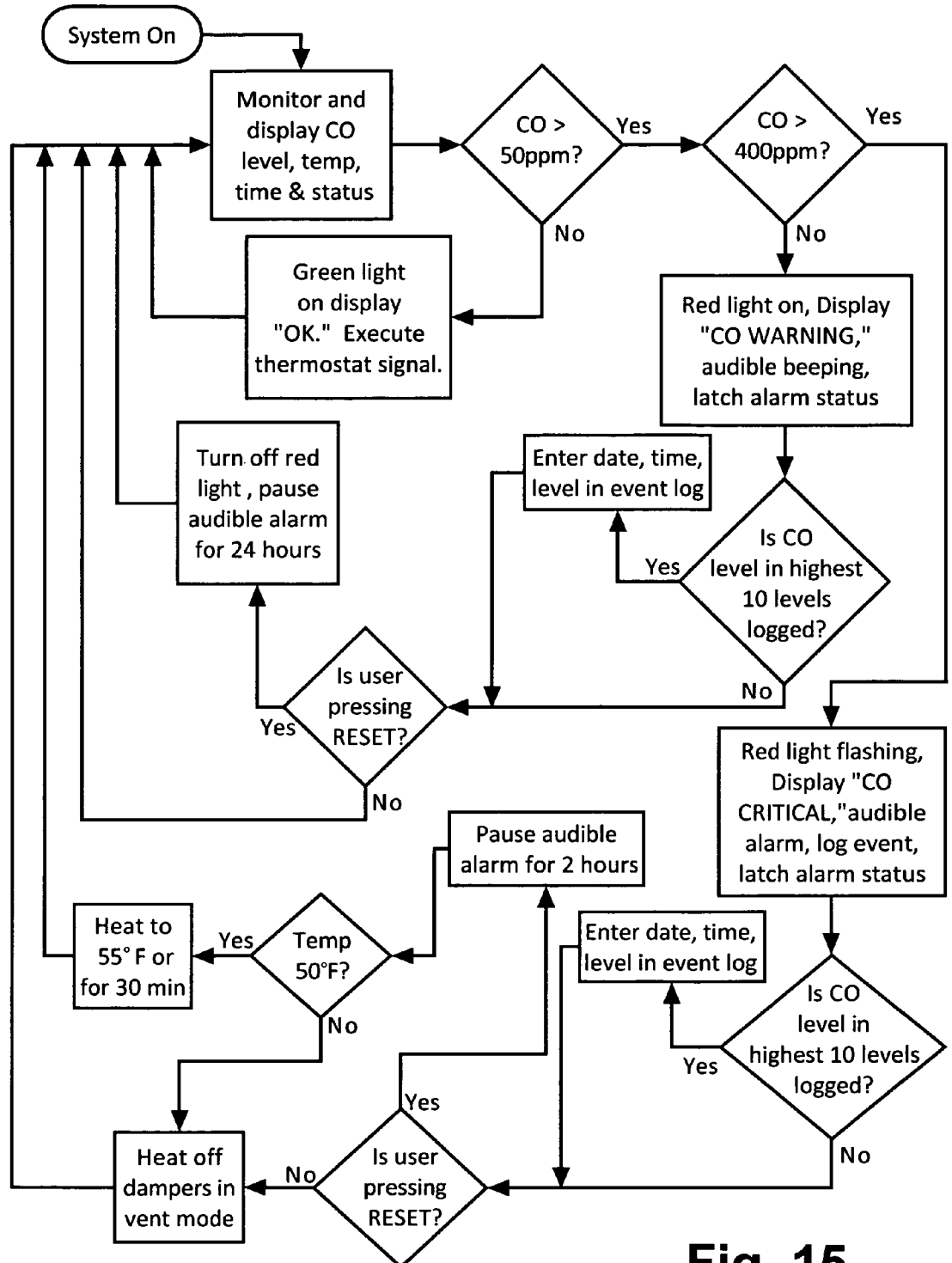

In the final drawing, FIG. 15, the program operation of flow diagram shows that when the system is on, the carbon monoxide (CO) level is monitored and if it is at a threshold of 50 parts per million, then there is a determination whether there is also at 400 parts per million. If the answer is "no", a red light warning line comes on with audible beeping and a latch status. If the answer is "yes", however, there is a critical display of "CARBON MONOXIDE (CO) CRITICAL", then the audible alarm sounds and a latch arm status, which leads to the determination of whether the carbon monoxide (CO) level is in the highest levels allowed. If the answer is "yes", the date is entered. If the answer is "no", it is a question of whether the user's pressing reset. If the answer is "yes", then there's a pause of the auto alarm for two hours, where after there is a determination of whether the temperature is greater than 50 degrees Fahrenheit.

If the answer is "no", the heat is off and dampers are in the vent mode. If the answer is "yes", the heat is 55 degrees Fahrenheit for thirty (30) minutes. Then the information is sent to the monitor and the loop is repeated. If the carbon monoxide (CO) is not determined initially to be 50 parts per million, then a green light displays "okay" and executes a thermostat signal, which then further monitors and displays the carbon monoxide (CO) level, temperature, time and status. If the carbon monoxide (CO) level is not the highest level, then there is a question of whether the user is pressing the reset and if so, the red light is turned off and a pause of the audio alarm occurs for twenty-four (24) hours.

Of the aforementioned components, the forced air gas furnace D1 fits through existing homes and may require slightly different parts in new HVAC installations. The supply duct/plenum D2, also known as a bonnet, can be made typically from 0.030 galvanized sheet metal or duct board. The cold air return duct, also known as the return duct D3, can be purchased complete or fabricated on site by a contractor. The starting collar, also known as a take off collar D4, can be used for rectangular ducts or for round pipes. These may have a damper built right in and an actuator needs to be added if so. The vent duct/plenum D5 may have three (3) major types: rectangular sheet metal ducting, round pipes or insulated flexible ducts. The supply duct/plenum D6 includes the air conditioning system evaporator coil, known as the A-Coil, and it is within the supply duct/plenum in which the evaporator coil is placed. Supply damper D8 fits to the supply plenum D6. The duct access door D7 provides a location to access the carbon monoxide (CO) detector operating within the supply plenum D6. The detector E1 can be mounted to it or on a flat sheet metal or other base. The supply damper D8 is an electrically actuated damper for the supply duct. It may be a louvered style or rotating damper element. The louvered style may have a lower profile. The vent damper D9 is usually a round damper, although the size and configuration can vary. For fresh inlet air applications, butterfly, offset pan, or a back draft damper may be used instead of a power damper. A duct booster fan may also be added optionally. The exhaust vent Dl0 is mounted on the outside of the house to provide an exit for the vented carbon monoxide or other gas. Louvers or flapper reduce the heat loss from drafts, as does insulated ducting. The fresh air vent D11 is similar to the exhaust vent, only this is configured to permit fresh air to come into the duct/plenum and therefore into the building. The carbon monoxide detector E1 may be set to have one (1) or two (2) pre-set carbon monoxide levels to respond to, rather than an analog system for the controller to read. The analog transmitter tells the controller exactly what the carbon monoxide (CO) level is so the controller can respond at any level. While carbon monoxide (CO) sent with a preset trip point simply tells the controller that the level is greater than a predetermined parts per million. The carbon monoxide system control module E2 handles all the decisions for the system and provides an interface for the user to get information and make changes. It includes a display optionally or color touch screen. It includes a micro controller in an enclosure with all the wiring connections, communicating with an optional alarm, such as a horn, a status light and user buttons. It may include off the shelf hardware or a custom controller board with all the hardware and connections integrated therein. The carbon monoxide detector signal cable E3 is typically a twisted pair or shielded 18-22 gauge cable. If a carbon monoxide detector with one (1) or (2) preset levels is used instead of an analog signal, it can be plain wire.

The power to control module E2 depends on the voltage required for the control module and it can be hard wired to 110 VAC in the furnace junction box or it can be plugged into an A/C wall outlet. The wall plug or power supply E5 is dependent on the voltage chosen for the control module, such as 110 VAC coming from the furnace.

The thermostat data fan and heat control cable E6 carries the thermostat signals to the control module from the furnace junction box and the fan and heat signals from the control module to the furnace. The vent damper on/off cable E7 carries power from the relay output on the control module to the respective damper. Alternatively, the relay may be located on the damper itself, with power running from a transformer and signal wire from the control module. The supply dampers on/off cable E8 is provided. The damper power transformer E9 converts 110 VAC power to low voltage DC required by the dampers. If the dampers run on 24 VAC and draw low current, it will use power from the transformer within the furnace. The duct air temperature sensor E10 monitors air temperature which plays a part in the logic to control the system. It may be integrated in the control module enclosure or it can be installed in the supply duct/plenum or return air duct/plenum to read an average temperature. The furnace junction box E11 is located is located inside the furnace where the electrical connections are made. The home thermostat E12 is typically on a wall in a building.

I claim:

1. The method of retrofitting an existing ventilation system in a building, said method comprising the steps of:

providing the existing ventilation system without an air quality sensor, having fans for exhausting stale air and bringing in fresh air, and having at least one remote switch terminal for setting a high speed mode of operation of said fans adding a relay to said existing ventilation system;

inserting in a specific location at least one air quality sensor;

connecting contacts of said relay to said remote switch terminals such that said relay is capable of setting continuous high speed modes of operation of said fans of said existing ventilation system; and, connecting said at least one air quality sensor in a parallel network to said relay so that when said at least one air quality sensor detects an abnormal air quality condition of air within said building, said relay is activated to set high speed operation of said fans regardless of a mode of operation at a time when the at least one air quality sensor detects a contamination indicative of the abnormal air quality condition.

2. The method of retrofitting an existing ventilation system in a building as in claim 1 wherein said at least one air quality sensor is a plurality of air quality sensors and said at least one location is a plurality of locations.

3. The method of retrofitting an existing ventilation system in a building as in claim 2 in which said plurality of air quality sensors are selected from the group of a carbon monoxide detector, a smoke detector, a fuel gas detector, a relative humidity detector, an ammonia sensor, and a methane sensor.

4. The method of retrofitting an existing ventilation system in a building as in claim 2 in which said plurality of air quality sensors are placed in locations of most concern for the particular air quality to be measured by each sensor.

* * * * *